Oct. 9, 1956 L. W. COUILLARD 2,766,375
DIRECT READING DECADE FREQUENCY TUNING SYSTEM FOR DOUBLE CONVERSION SUPERHETERODYNE RECEIVER
Filed May 10, 1951
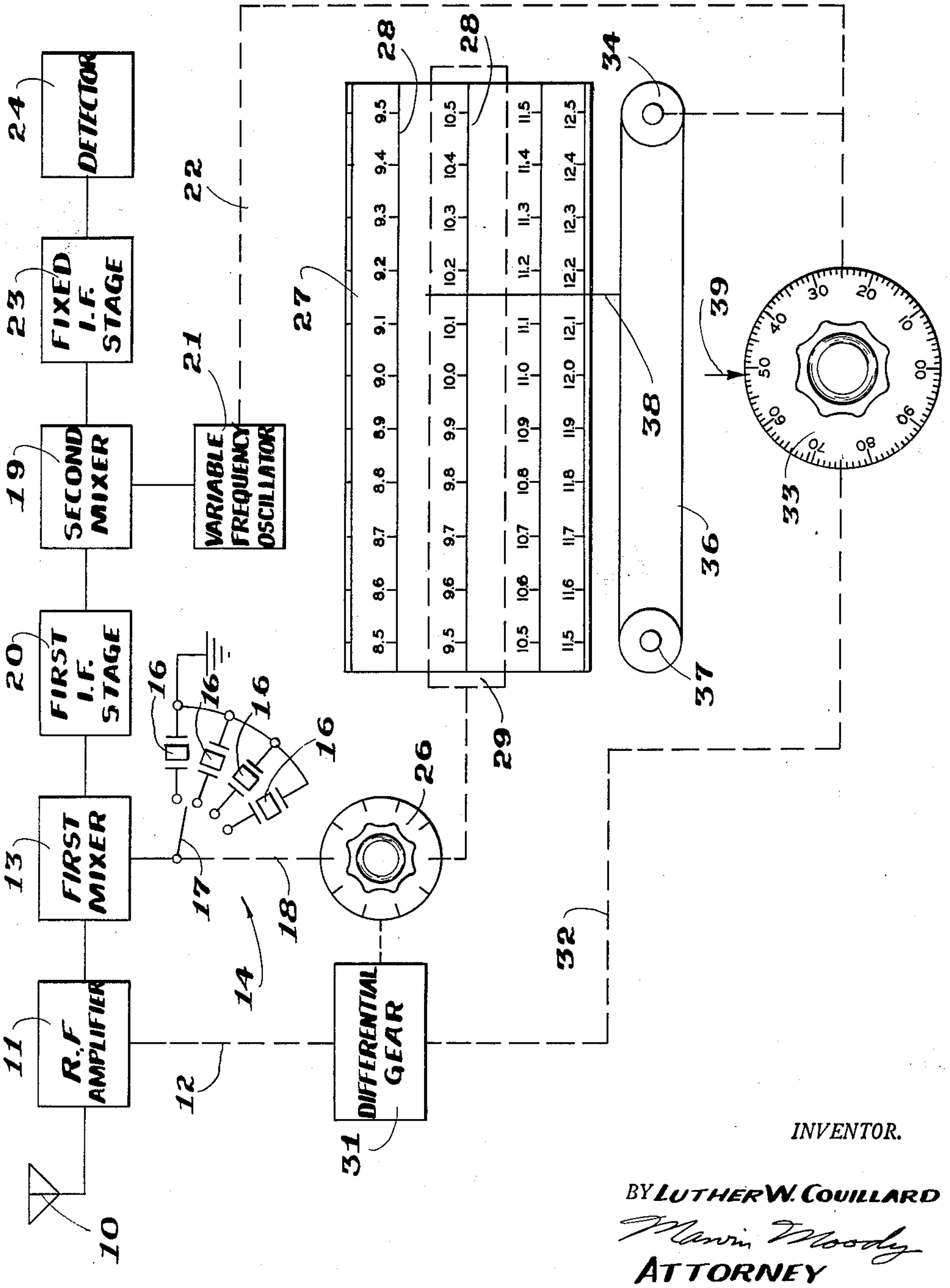
INVENTOR.
BY LUTHER W. COUILLARD
Marvin Moody
ATTORNEY

United States Patent Office 2,766,375

Patented Oct. 9, 1956

2,766,375

DIRECT READING DECADE FREQUENCY TUNING SYSTEM FOR DOUBLE CONVERSION SUPERHETERODYNE RECEIVER

Luther W. Couillard, Cedar Rapids, Iowa, assignor to Collins Radio Company, Cedar Rapids, Iowa, a corporation of Iowa Application May 10, 1951, Serial No. 225,531

2 Claims. (Cl. 250—20)

This invention relates in general to a direct reading decade presentation and tuning system for receivers.

It is oftentimes desirable to tune a radio receiver over a very large frequency range as, for example, 0–30 megacycles. Over this range selectivity of any frequency might be plus or minus one kilocycle.

In order to tune over this range with this selectivity it becomes necessary normally to band switch over a number of smaller ranges and tune the final adjustments with an accurately calibrated variable frequency oscillator.

It is an object of this invention, therefore, to provide a direct reading frequency indication for a receiver which will read five significant figures.

Another object of this invention is to provide a tuning and presentation system for controlling a receiver over a broad band of frequencies while still maintaining great selectivity at a particular frequency.

Yet another object of this invention is to provide means for instantaneously indicating the frequency to which a receiver is tuned.

A feature of this invention is found in the provision for a band switch connected to a frequency drum that indicates the first two significant figures being tuned. A fine adjustment switch moves a pointer on the frequency drum to indicate the third significant figure and the last two significant figures are indicated on the periphery of the fine tuning adjustment.

Further objects, features, and advantages of the invention will become apparent from the following description and claims when read in view of the drawing, in which The figure illustrates the direct reading decade presentation and tuning system of this invention.

The figure illustrates an antenna 10 which supplies an input to a tunable radio frequency amplifier 11 that may be tuned to the desired input by a control shaft 12. A first mixer 13 receives the output of the tunable radio frequency amplifier 11 and a second input from a crystal oscillator 14 comprising a plurality of crystals 16 and a selector switch 17 which is controlled by a band shaft 18. The switch 17 may be connected to any of the crystals.

The output of mixer 13 is supplied to a first intermediate frequency stage 20. A second mixer 19 receives the output of the first intermediate frequency stage and an input from a variable frequency oscillator 21.

The frequency of the variable frequency oscillator 21 is controlled by a shaft 22. A fixed intermediate frequency stage 23 receives the output of the mixer 19 and a detector 24 receives the output of the fixed intermediate frequency 23 to detect the modulation.

A band switch 26 is connected to the band shaft 18 and is also connected to a frequency drum 27 which has printed longitudinally about its periphery a plurality of bands with the low end of one band starting at the high end of the previous band. The band switch 26 rotates in fixed increments so that one of the bands 28 is always in the center of a window 29 of the receiver. The selector switch 17 moves in increments with the band switch 26 and chooses a crystal 16 corresponding to the desired band to tune the first mixer.

A differential gear 31 is also shafted to the band switch 26 and supplies an output to the control shaft 12 connected to the tunable radio frequency stage. The radio frequency stage 11 might be tunable with a plurality of permeability tuned coils, or alternatively, it might be capacitively tuned.

Thus, the band switch 26 tunes the receiver to the nearest magacycle, for example. In other words, the band 28 appearing in window 29 of the drawing indicates that it is desired to tune the receiver in the vicinity of 10 megacycles, for example.

The differential gear 31 is connected by a shaft 32 to a fine frequency adjustment dial 33. The differential gear 31 adds the shaft inputs from the band switch 26 and the fine frequency dial 33 and supplies the sum to the shaft 12. The dial 33 is continuously variable and thus the radio frequency stage may be continuously tuned.

The fine frequency dial 33 is also shafted to a pulley 34 which is connected by a belt 36 to a second pulley 37. A pointer 38 is connected to one side of the belt 36 and moves in response to rotation of the fine adjustment 33. Indicator 38 shows the number of tenths of megacycles to which it is desired to tune. For example, in the figure, the indicator 38 is shown between 10.1 and 10.2 magacycles and the operator knows that his third figure is one-tenth.

A reference arrow 39 is printed adjacent the edge of the fine frequency dial 33 and the periphery of the dial 33 is calibrated in one hundred steps. The number of kilocycles from 0 to 100 may be read on this dial. In the figure the arrow 39 is indicating 51 kilocycles and thus, the receiver is set to receive 10.151 megacycles. The dial 33 is also connected to a shaft 22 which controls the variable frequency oscillator 21. Thus means are provided for tuning the receiver accurately to within one kilocycle.

If it is desired to change the frequency to 11.732 megacycles, the band switch 26 is moved two positions to bring the 11.5–12.5 megacycle band within the window 29 and the fine adjustment dial 33 is rotated to move the pointer 38 between 11.7 and 11.8 and until 32 is adjacent arrow 39. The pointer 38 moves one-tenth of a magacycle for each rotation of the dial 33.

The differential gear 31 controls the radio frequency stage 11 and thus keeps it tuned to the new frequency. The selector switch 17 chooses the correct crystal for the band being used and the variable frequency oscillator 21 might tune from 3 to 2 megacycles. This range is reused over and over again to obtain a fixed intermediate frequency. The first oscillator 14 produces a frequency which when mixed with the output of the variable frequency oscillator 21 gives a fixed intermediate frequency. The variable frequency oscillator 21 might be a precision permeability tuned oscillator such as shown in Patent Number 2,509,231, issued on May 30, 1950, to Theodore A. Hunter and entitled Oscillator. This oscillator is very accurate and makes it possible to tune over the broad band of desired frequencies while maintaining an accuracy within a couple of kilocycles.

It is seen that this invention provides means for instantaneously tuning and presenting to the operator of a receiver the frequency to which it is tuned and allows him to read frequency to five places.

Although the invention has been described with respect to a preferred embodiment, it is not to be so limited as changes and modifications may be made therein which are within the full intended scope of the invention as defined by the appended claims.

I claim:

1. In combination with a radio apparatus of the double conversion type including a first mixer and a step-tuned oscillator having a tuning means effective to establish a selected one of a plurality of frequency bands and a second mixer with a continuously variable oscillator having tuning means effective to establish a selected frequency to which said apparatus is tunable, a tuning indicator comprising a rotatably mounted drum having a plurality of circumferentially spaced frequency calibrated scales, each scale corresponding to a different one of said frequency bands and extending axially of the drum and having plural spaced scale division marks, each division mark corresponding to a decimal part of said frequency band, fixed reference means adjacent the periphery of said drum for exposing one of said scales, means for driving the tuning means of the step-tuned oscillator and said drum synchronously for tuning said receiver to a selected band as indicated by the scale opposite said reference means, an indicator mounted for movement axially of said drum adjacent the frequency scale of the selected frequency band, means coupling the tuning means of said variable oscillator and said indicator for synchronous movement for tuning said apparatus within said selected band to a selected decimal part of said band as indicated by the scale division mark opposite said indicator, a dial provided with a scale having subdivision marks, each subdivision mark corresponding to decimal part of the space between said division marks, an index adjacent said dial, driving means for said coupling comprising a shaft connected to said dial for moving said indicator one scale division for each rotation of said dial for tuning said apparatus within said selected decimal part of said selected band to a frequency indicated by the subdivision mark opposite said index.

2. An accurate tuning and presentation system for a radio receiver comprising, a step-tunable stage with a control shaft, a continuously and uniformly variable frequency oscillator with a tuning shaft, a band switch, a frequency drum provided with plural circumferentially spaced scales, each scale corresponding to a different position of said band switch and having spaced scale division marks, said band switch being connected to the control shaft of said step-tunable stage of said receiver and to said frequency drum, a fine frequency dial rotatably supported and connected to the tuning shaft of said variable frequency oscillator stage of said receiver, a differential gear receiving inputs from said band switch and said fine frequency dial to add them and supply their outputs to a shaft tunable radio frequency stage of the receiver, said fine frequency dial being calibrated about its periphery, an indicia printed adjacent said dial, a pair of pulleys rotatably supported adjacent the frequency drum and carrying a flexible belt between them, an indicator mounted on said belt for movement across a selected one of said scales, and one of said pulleys being shaft connected to said fine frequency dial to move the indicator across said scales in response to rotation thereof, each revolution of said fine frequency dial moving said indicator along a decimal part of said scales as defined by said scale division marks.

References Cited in the file of this patent

UNITED STATES PATENTS

| | | |
|---|---|---|
| 1,719,178 | Halloran | July 2, 1929 |
| 1,877,228 | Curtis et al. | Sept. 13, 1932 |
| 2,052,701 | De Tar | Sept. 1, 1936 |
| 2,120,136 | Lyman | June 7, 1938 |
| 2,137,684 | Gillard | Nov. 22, 1938 |
| 2,151,810 | Siemens | Mar. 28, 1939 |
| 2,263,634 | Landon | Nov. 25, 1941 |
| 2,344,825 | Lear | Mar. 21, 1944 |
| 2,487,857 | Davis | Nov. 15, 1949 |
| 2,505,754 | Combs | May 2, 1950 |
| 2,539,537 | Harley et al. | Jan. 30, 1951 |
| 2,567,860 | Shapiro | Sept. 11, 1951 |